United States Patent [19]

Croghan et al.

[11] Patent Number: 5,368,077
[45] Date of Patent: Nov. 29, 1994

[54] ZERO LEAD PLANER

[75] Inventors: Charles L. Croghan, Troutdale; David J. Johnson, Portland, both of Oreg.

[73] Assignee: U.S. Natural Resources, Inc., Vancouver, Wash.

[21] Appl. No.: 125,543

[22] Filed: Sep. 22, 1993

[51] Int. Cl.5 .............................................. B27C 1/08
[52] U.S. Cl. ...................... 144/117 R; 144/114 R; 144/116; 144/130; 144/230; 144/375; 144/246 R; 144/249 A
[58] Field of Search .................... 144/3 R, 114 R, 116, 144/117 R, 117 A, 128, 130, 131, 230, 231, 236, 237, 242 R, 246 R, 249 R, 249 A, 373, 375

[56] References Cited

U.S. PATENT DOCUMENTS

| 166,444 | 8/1875 | Woodbury | 144/117 A |
|---|---|---|---|
| 2,102,186 | 12/1937 | Nicholson et al. | 144/116 |
| 2,630,150 | 3/1953 | Lacelle | 144/130 |
| 2,819,744 | 1/1958 | Chuet et al. | 144/116 |
| 2,859,780 | 11/1958 | Carlson | 144/116 |
| 2,969,816 | 1/1961 | Johnsa | 144/117 R |
| 3,082,802 | 3/1963 | Dickson et al. | 144/116 |
| 4,394,878 | 7/1983 | Rice et al. | 144/117 R |
| 4,611,646 | 9/1986 | Wassmer et al. | 144/117 R |
| 4,724,877 | 2/1988 | Culley, Jr. | 144/117 R |
| 4,842,029 | 6/1989 | DeAbreu | 144/117 R |

Primary Examiner—W. Donald Bray
Attorney, Agent, or Firm—Robert L. Harrington

[57] ABSTRACT

A planer is improved by recognizing the source of instability of a board relative to a guidebar. An angled relationship between feed roller force the guidebar and holds the board against the guidebar. Traditional cutting heads urging the board in the opposite direction relative to that of the feed rollers, develop lateral force vectors kicking the board away from the guidebar. By establishing a zero lead relationship between the cutter heads and the board as it rests against the guidebar, the board enjoys greater stability. The disclosed apparatus further includes an air regulated top pressure plate establishing a given separation between itself and a cutter head, but accommodating abnormal operating conditions, i.e., jammed boards, by vertical movement relative to the cutter head facilitates remote actuation to quickly relieve a jammed condition. Also shown, a bearing housing for a cutter head support shaft is carried on an articulated hinge to improve manual mounting of the bearing housing upon the shaft.

14 Claims, 12 Drawing Sheets

ZERO LEAD PLANER

BACKGROUND OF THE INVENTION

The present invention relates generally to wood processing apparatus, and particularly to a planer producing smooth surfaced high grade dimensioned lumber.

A planer is a crucial portion of a dimensioned lumber manufacturing process. The planer takes rough sawed boards and cuts each surface to provide a smooth, planed final product. Planers operate at tremendous production levels. For example, a typical planer will run on average 1,400 lineal feet of dimensioned lumber per minute. The planer feeds a downstream process including grading, sorting and stacking stations. If the planer goes off line, the entire operation shuts down and production is lost. Thus, maintaining constant, high output by the planer is crucial to overall production.

Because planers operate at such high capacity and with close tolerance relative to board dimensions, boards sometimes become jammed in the planer and require manual removal. Typically, the planer operator must shutdown the planer and physically manipulate the planer, e.g., move vertically a pressure plate opposing a cutter head, to remove jammed or oversized wood articles. As may be appreciated, the operator must quickly resolve any such jams to maintain high production levels. Another source of production loss is the need to dismount cutter heads. While spare cutter head assemblies may be available for mounting, the process of removing supporting shafts, bearing housings, and cutter heads requires time, operator effort, and the assistance of lifting devices, e.g., a crane. Thus, the task of removing a cutter head assembly and mounting a new cutter head assembly can significantly decrease production levels.

Planers often introduce defects into the resulting product due to board instability as it encounters the planer cutter heads. Such defects devalue a given percentage of the production run.

Figure 1:
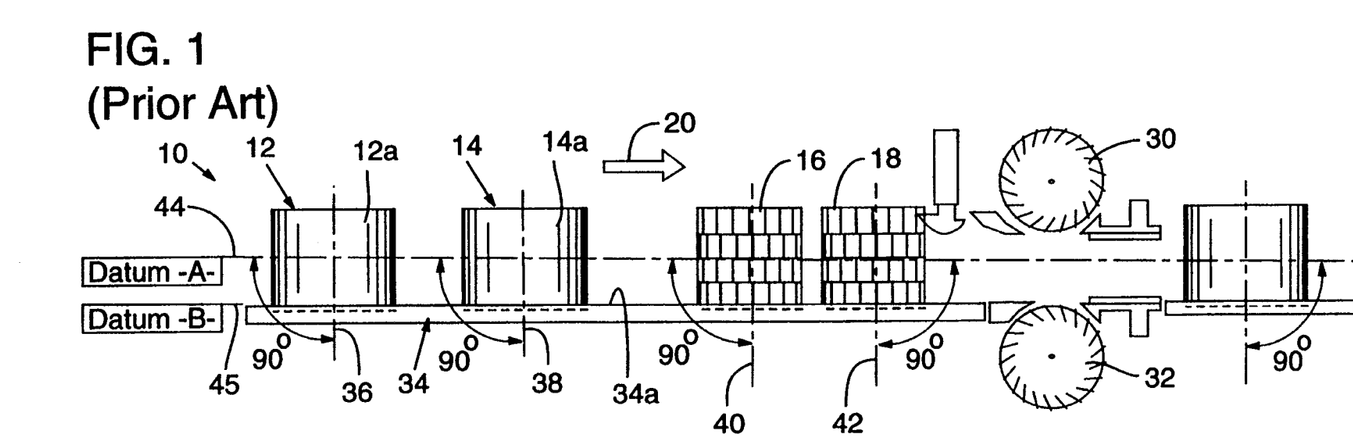
FIG. 1 illustrates schematically a prior art planer design including angled lead arrangements.

FIG. 1 illustrates schematically a top view of a conventional planer arrangement including a first infeed roller pair 12 and a second infeed roller pair 14. Each roller pair 12 and 14 includes an upper roller and a lower roller, FIG. 1 illustrating only the upper rollers 12a and 14a, it being understood that directly below rollers 12a and 14a are corresponding lower rollers of each roller pair. Roller pairs 12 and 14 capture a board between the upper and lower rollers and propel the board past a top cutter head 16 and a bottom cutter head 18. Cutter head 16 cuts the upper surface of the board as the board bears against an opposing bed plate (not shown in FIG. 1) while slightly downstream cutter head 18 cuts the lower surface of the board as the board bears against an opposing top pressure plate thereabove. Planer 10 further includes downstream a left side cutter head 30 and a right side cutter head 32 planing left and right sides, respectively, of the board passing therebetween.

Thus, a board driven through planer 10 by feed roller pairs 12 and 14 passes by the cutter heads 16, 18, 30, and 32. The rotational direction of roller pairs 12 and 14 define a feed direction 20. To maintain the board stable throughout the planing processing, a guidebar 34 defines the feed path. The board must be maintained stable against the guidebar 34 to achieve a smooth planed surface on all sides of the board and avoid planing defects. Traditional planers maintain the board against the guidebar 34 by providing an angled lead for the board relative to a planer centerline. More particularly, each of the rollers 12 and 14 and the cutter heads 16 and 18 have parallel axes of rotation 36, 38, 40, and 42, respectively. The axes of rotation 36, 38, 40, and 42 are all normal, i.e., ninety degrees, to a planer 10 centerline 44. Force vectors developed by roller pairs 12 and 14 and by cutter heads 16 and 18 and applied to the board are, therefore, parallel to centerline 44. Guidebar 34 lies parallel to an angled datum line 45, with datum line 45 more widely separated from centerline 44 at the infeed portion of planer 10 then at the downstream or outfeed portion of planer 10. The face 34a of guidebar 34 has a given, slight angled relationship relative to the axes of rotation 36 and 38 for feed rollers 12 and 14. The force of movement applied to the board by roller pairs 12 and 14 is, therefore, into the face 34a guidebar 34 rather than parallel to guidebar 34. As a result, board 20 is maintained against guidebar 34 by virtue of the angled lead established between the board and roller pairs 12 and 14.

Despite this angled lead arrangement maintaining the board against guidebar 34, traditional planers still suffer from instability of the board as its passes through the planer. When the board is not well set against the guidebar 34 as it encounters the cutter heads 16 and 18, lateral movement of the board relative to guidebar 34 results and a defect known as a "snipe" wherein the cutter head digs excessively into the board surface and thereby downgrades the board. It is estimated that snipping of dimensioned lumber can downgrade as much as five to seven percent of a production run. As may be appreciated, five to seven percent downgrade of processed lumber can, over time, result in significant loss of overall product value.

To solve snipping problems in planers, prior designs have included holdover shoes or snipe shoes positioned as additional short guidebars creating lateral counter forces directly against the board forcing it to maintain contact with the guidebar 34 as the board passes the cutter heads 16 and 18. Unfortunately, force applied to the board as it moves rapidly through the planer results in frictional heat buildup, especially in the guidebar 34. As a result, guidebars have required water cooling systems to dissipate such heat energy and avoid the risk of fire in the planer machinery. Generally, prior planer designs have merely attempted to increase the lateral forces applied directly to the board to maintain the board stable against the guidebar 34 and thereby reduce the occurrence of snipping defects. Such additional snipping or holdover shoes add to the complexity of the machine and should not be considered a solution to the problem of snipping in a planer due to the associated frictional heat buildup.

Accordingly, it would be desirable to minimize the effect of snipping in a planer without including such excess apparatus, i.e., holdover shoes and snipping shoes, while still resolving the problem of stability of a board against a guidebar while the board moves rapidly through a planer. It would be further desirable to make more efficient the operation of a planer by minimizing operator effort required to accomplish such tasks as cutter head change over and correcting jammed or oversized wood articles.

SUMMARY OF THE INVENTION

The present invention recognizes the source of instability in a board-moving through a planer. In particular, the present invention recognizes that instability of a board relative to the guidebar results from the relative orientation of the board to the cutter heads. While the feed rollers provide appropriate force vectors to drive the board into the face of the angled guidebar, the cutter heads in fact develop force vectors in the opposite direction and tend to kick the board away from the guidebar. The cutter heads rotate opposite that of the feed rollers and the angled lead arrangement normally used in a planer is with respect to the feed rollers not the cutter heads. In particular, as the leading corner of the board hits the oncoming first blade of the cutter head, the blade tends to kick the board away from the guidebar. As a result, the board is generally unstable at this critical point and snipping is more likely to occur.

In accordance with the present invention, an angled lead arrangement is established with respect to the feed rollers for driving the board into the face of the guidebar, but a zero lead arrangement is established with respect to the upper and lower cutter heads. Thus, the board has a lead angle with respect to the axes of rotation for the feed rollers, but travels generally normal to the axis of rotation for the upper and lower cutter heads. A zero lead relationship, i.e., ninety degrees, between the board and cutter head axes of rotation is established and force applied to the board by the cutter heads is generally parallel to the guidebar and to the board. As a result, cutter head force vectors applied to the board are longitudinal and do not disrupt stability of the board against the guidebar. Improved processing results with fewer occurrences of downgrading, e.g., snipping. Accordingly, overall production is improved by recovering more value from the processed lumber.

Because the force of board instability is reduced or substantially eliminated, i.e., by virtue of the zero lead relationship of the cutter heads, many other sources of force applied directly to the board to maintain the board against the guidebar are reduced and may be set to engage only twisted or crooked boards. More particularly, many of the additional snipe and holdover shoes could possibly be removed. Furthermore, an even smaller lead angle for the guidebar as it relates to the feed rollers can be used. Normally, a one-sixteenth inch over one foot angle is used as a lead relationship between the guidebar and the planer centerline. Under the present invention, however, because the board experiences less cutter head force vectors tending to move it away from the guidebar, a smaller lead angle may be employed, e.g., perhaps one-thirty second inch over one foot, and thereby further reduce heat friction developed along the guidebar.

In accordance with one aspect of the present invention, a planer remains more constantly in service by reducing the time and effort required to service the planer during operation. In particular, a planer cutter head is more quickly dismounted by virtue of a hinge mounted bearing arrangement. The hinge mounted bearing arrangement maintains a bearing housing on an articulated hinge whereby the cylindric bore of the bearing housing may be moved precisely co-axially along a cutter head support shaft. The supporting hinge arrangement allows the operator to quickly dismount the bearing housing, replace the cutter head on the support shaft, and then quickly remount the bearing housing.

In accordance with another aspect of the present invention, a modular, stackable cutter head includes individual cutter head modules stackable and slidably positioned upon a support shaft for improved planer maintenance. The cutter head modules may be used on either top or bottom cutter head assemblies, and include overlapping cutter blades between adjacent modules to accomplish smooth planing of dimensioned lumber. Because the cutter head modules are each of relatively lighter weight than a traditional cutter head, the cutter head modules may be manually mounted upon a shaft without the aid of a crane. Accordingly, cutter head change over is more rapidly accomplished. Furthermore, due to the modularity of the stackable cutter head under the present invention, cutter head modules may be moved relatively within a given set of cutter head modules to produce more even wear of cutter blades, i.e., move less worn blades to a position experiencing more wear. As a result, more complete and versatile use of cutter blades is accomplished.

In accordance with another aspect of the present invention, a pressure plate opposing one of the cutter heads is air regulated and remotely controlled. As a result, a jam condition in the planer may be relieved by remote actuation of the pressure plate, i.e., more widely separating the pressure plate and the opposing cutter head to allow the jammed article to pass through, for improved overall operation. Air pressure is used as a biasing or regulating force whereby, upon presentation of sufficiently large jamming force, the pressure plate moves automatically away from the opposing cutter head to reduce the potential for damage to the planer and more quickly relieve a jammed or oversized board condition.

The subject matter of the present invention is particularly pointed out and distinctly claimed in the concluding portion of this specification. However, both the organization and method of operation of the invention, together with further advantages and objects thereof, may best be understood by reference to the following description taken with the accompanying drawings wherein like reference characters refer to like elements.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION OF THE PREFERRED EMBODIMENT

The preferred embodiment of the present invention is a planer including a zero lead relationship between the cutter heads and the article to be cut to improve stability of the article against a guidebar and thereby reduce defects caused during the planing processing. Also, the preferred embodiment of the present invention includes features improving production capacity by reducing time and effort required to change cutter heads and deal with jammed or oversized boards. Overall, the present invention provides sustained production capacity by avoiding or reducing down time and by avoiding product downgrading and devaluation resulting from planer related defects.

Figure 2:
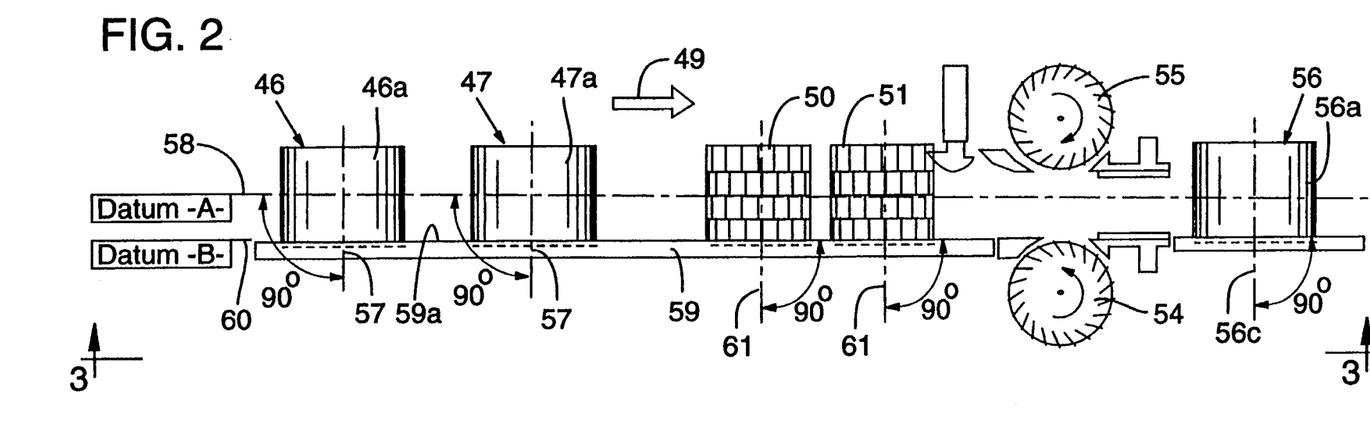
FIGS. 2 and 3 illustrate schematically side and top views of a zero lead cutter head arrangement for a planer in accordance with the present invention.
Figure 3:
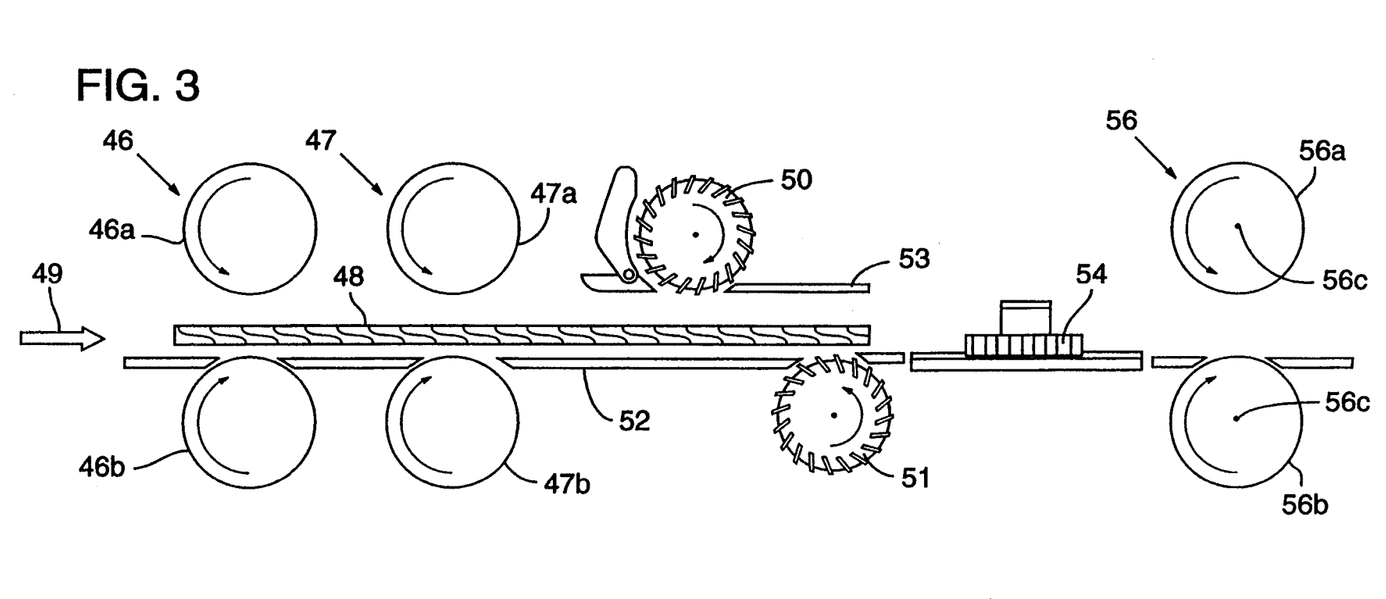

FIGS. 2 and 3 are side and top schematic views, respectively, of a planer according to a preferred embodiment of the present invention. In FIGS. 2 and 3, infeed roller pairs 46 and 47, roller pair 46 including an upper roller 46a and a lower roller 46b and roller pair 47 including an upper roller 47a and a lower roller 47b, capture a board 48 (FIG. 3) between upper and lower members of each pair. In the view of FIG. 3, upper rollers 46a and 47a rotate in the counterclockwise direction while lower rollers 46b and 47b rotate in the clockwise direction. Accordingly, board 48 moves rightward, in the view of FIG. 3, along a feed direction 49. A top cutter head 50 and bottom cutter head 51 downstream from roller pairs 46 and 47 cut top and bottom surfaces, respectively, of board 48. Top cutter head 50 rotates clockwise in the view of FIG. 3 while bottom cutter head 51 rotates counter clockwise in the view of FIG. 3. Thus, cutter heads 50 and 51 apply leftward, in the view of FIGS. 2 and 3, forces opposing the feed direction 49. Top cutter head 50 is opposed by a main bed plate 52 and bottom cutter head 51 is opposed by a pressure plate 53. Right and left side cutter heads 54 and 55, respectively, downstream from cutter heads 50 and 51, complete the planing process by cutting the side surfaces of board 48. Finally, an outfeed roller pair 56, individually upper outfeed roller 56a and lower outfeed roller 56b pull the board through the cutter heads and propel the board 48 out of planer 10.

Referring now to FIG. 2, under the present invention the parallel axes of rotation 57 for the roller pairs 46 and 47 are normal to the centerline 58, the guidebar 59 is parallel to a datum line 60 angled slightly with respect to centerline 58, and the axes of rotation 61 for cutter heads 50 and 51 are normal to the datum line 60. In this manner, the feed roller pairs 46 and 47 drive board 48 into the face 59a of guidebar 59. Because the axes of rotation 61 for cutter heads 50 and 51 are normal to the guidebar face 59a, however, force vectors developed upon impact of cutter heads 50 and 51 with board 48 are generally longitudinal relative to board 48 and do not kick board 48 laterally away from face 59a of guidebar 59. Finally, the axes of rotation 56c for outfeed roller pair 56 are also normal to the datum line 60, and therefore normal to the guidebar face 59a. In this manner, outfeed roller pair 56 pulls the board longitudinally along guidebar 59 without introducing any lateral forces relative to the face 59a of guidebar 59.

Planers are traditionally manufactured with one centerline defining the orientation of axes of rotation for major rotating components, i.e., infeed and outfeed roller pairs and cutter heads. Modification to such traditional planer arrangements under the present invention requires an additional reference line, i.e., datum line 60. To minimize alteration of traditional planer design, it is suggested that the mounting assemblies (not shown) for cutter heads 50 and 51 include adjustment to provide a normal relationship between axes of rotation 60 and 61 and the datum line 60, i.e., angular positioning to set the axes of rotation 60 and 61 normal to the face 59a of guidebar 59. In this manner, the cutter heads 50 and 51 engage the board 48 with a zero lead relationship and, therefore, do not introduce force vectors kicking board 48 laterally away from guidebar 59. To establish such zero lead relationship, it is suggested that the mounting of the cutter head assemblies be established with slightly oversized mounting holes. In this manner, prior to securing the cutter head assemblies to the planer frame by tightening of mounting bolts, the cutter head assemblies can be slightly rotated relative to the frame to establish the desired zero lead relationship between cutter heads 50 and 51 and datum line 60.

While shown herein as a zero lead relationship between the axes of rotation 60 and 61 relative to the guidebar face 59a, it may be desirable to provide a reverse angled lead relationship between the axes of rotation 60 and 61 and the face 59a of guidebar 59. Under such reverse angled lead relationship, force vectors developed upon impact of cutter head blades with the board include transverse components directed into the face 59a of guidebar 59. In other words, an angled relationship opposite that of the infeed roller pairs 46 and 47. Both the infeed roller pairs 46 and 47 and the cutter heads 50 and 51 would then urge the board against the face 59a of guidebar 59. In this manner, planer 10 produces no force vectors urging the board away from the face 59a of guidebar 59. In contrast, traditional planer design pits the lateral force vectors developed by the infeed rollers against lateral force vectors developed by the cutter heads, and as a result board instability relative to the guidebar exists in traditional planer design.

Figure 4:
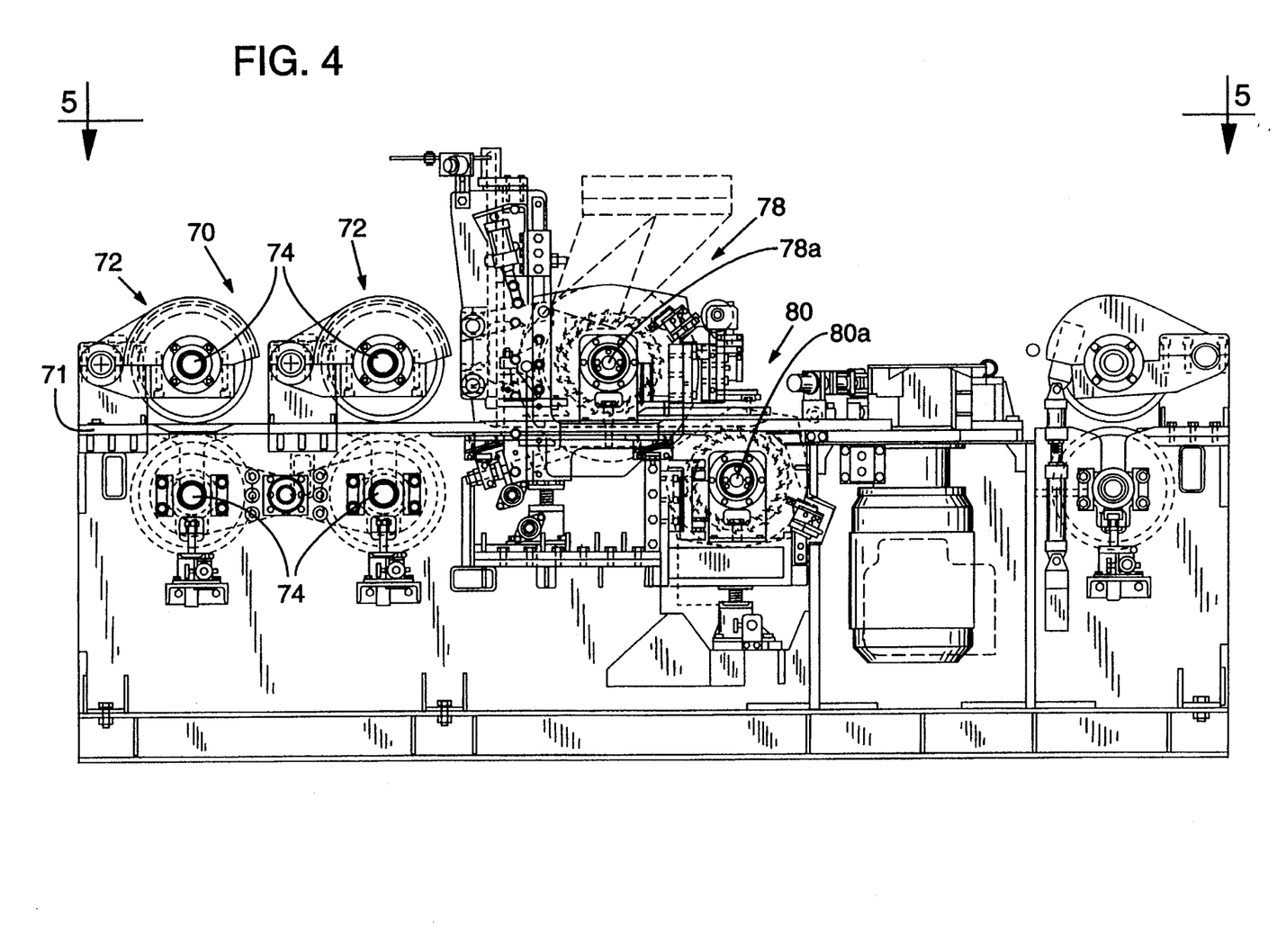
FIG. 4 is a more detailed side view of a planer according to the present invention.
Figure 5:
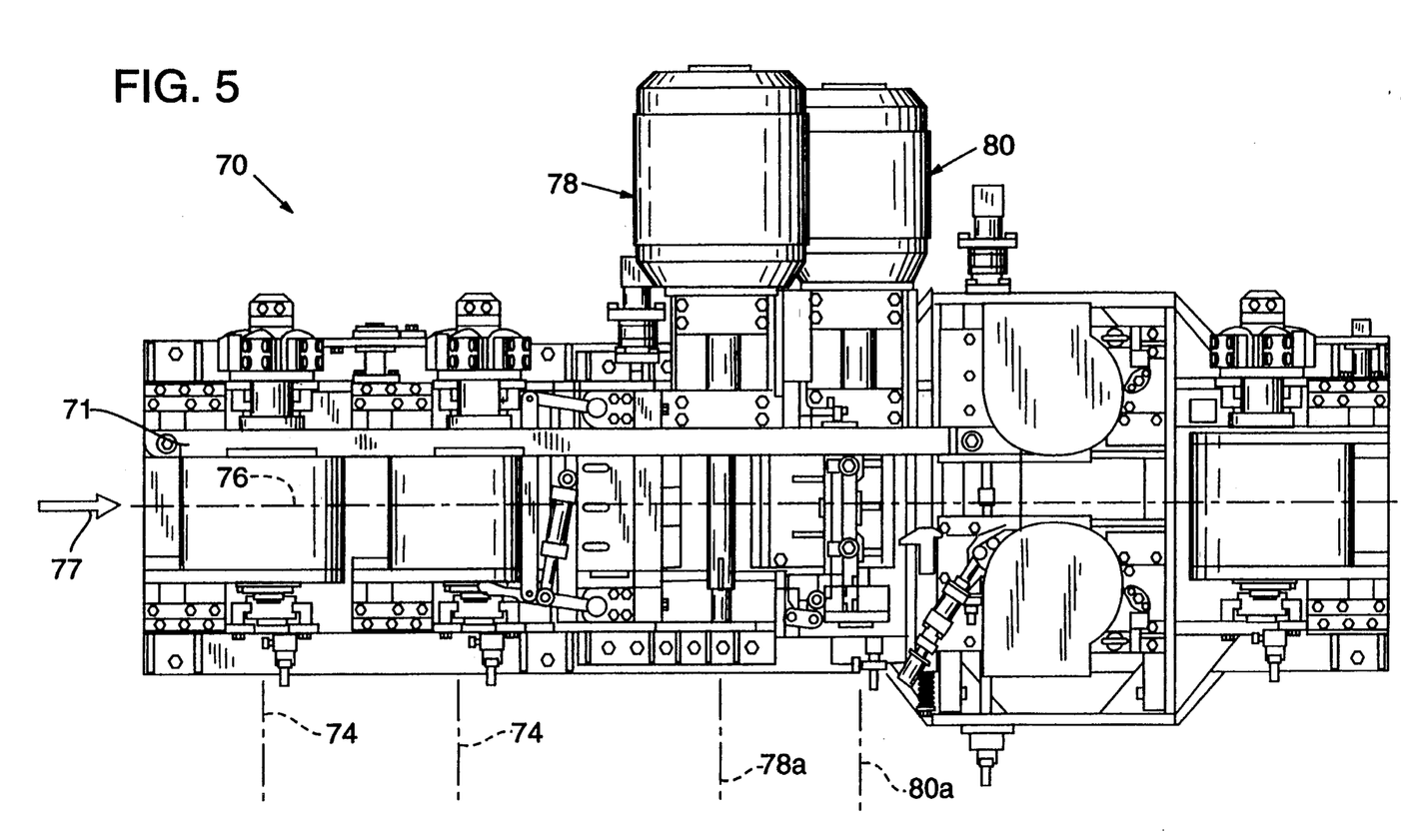
FIG. 5 is a top view of the planer of FIG. 5.

FIGS. 4 and 5 illustrate in more detail side and top views, respectively, of a planer 70 according to a preferred embodiment of the present invention. Planer 70 includes infeed roller pairs 72 according to conventional design. In particular, the axis of rotation 74 for each roller of roller pairs 72 is normal to the centerline 76 of planer 70. In accordance with normal operation of such devices, roller pairs 72 force a wood article along a feed direction 77 through planer 70. As discussed above in connection with the schematic illustration of a planer in FIGS. 2 and 3, the guidebar 71 of planer 70 has an angled lead relationship to the axis of rotation 74 for each roller of roller pairs 72, i.e., guidebar 71 is angled relative to centerline 76 to allow roller pairs 72 to drive a board into guidebar 71.

Planer 60 further includes a top cutter head assembly 78 and a bottom cutter head assembly 80. Generally, cutter head assemblies 78 and 80 are mountable upon planer 70 in conventional fashion, but include adjustment, e.g., oversized mounting bolt holes, to establish a given angular relationship, e.g., zero lead, between axes of rotation 78a and 80a, respectively, relative to the datum line 76. As previously discussed, such adjustment in angular relationship between the axes of rotation 78a and 80a establishes appropriate force vectors on a wood article along the guidebar 71 rather than laterally away from guidebar 71.

Figure 6:
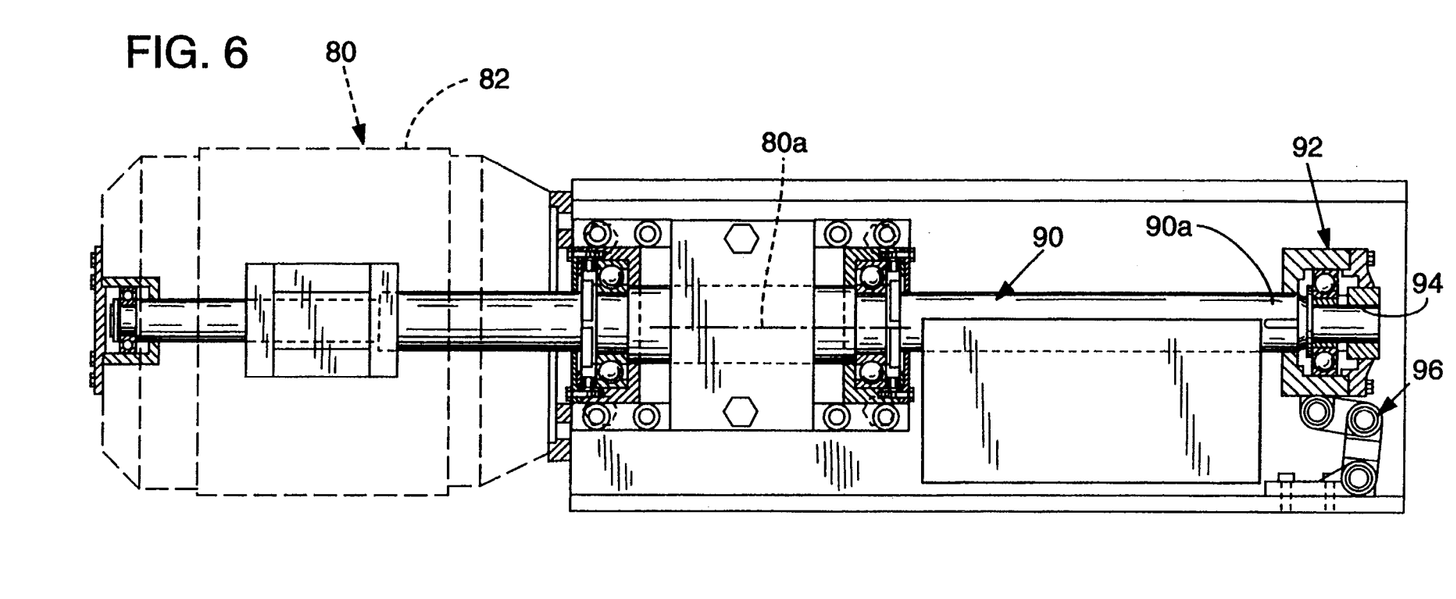
FIG. 6 is a top view of a bottom cutter head assembly of the planer of FIGS. 4 and 5.

FIG. 6 illustrates separately the lower cutter head assembly 80 including a drive motor 82 coupled to a cutter head support shaft 90, the axis of shaft 90 defining the axis of rotation 80a for cutter head assembly 80. In FIG. 6, the shaft 90 is supported at its distal end 90a by an outboard bearing housing 92. The bearing housing 92, typically weighing on the order of 80 to 90 pounds, receives the distal end 90a of shaft 90 within a grease locking sleeve 94. The distal end 90a of shaft 90 and sleeve 94 are cylindric and closely dimensioned to closely hold the shaft 90 in its desired position during operation of planer 60. Bearing housings can be difficult to mount on shaft 90 due to the close cylindric dimensioning between sleeve 94 and distal end 90a of shaft 90 establishing a requirement of strict co-axial movement when mounting.

In accordance with the present invention, however, housing 92 is carried on an articulated hinge assembly 96. Hinge assembly 96 maintains bearing housing 92 at a given elevation, i.e., supports the weight of housing 92 at a specific height, whereby the operator merely co-axially aligns the housing 92 for mounting on the shaft 90. The hinge arrangement 96 thereby greatly reduces operator effort required to mount housing 92 on shaft 90. Prior mounting arrangements would require the operator to manually hold the weight of housing 90 with great difficulty in aligning the sleeve 94 co-axially for mounting on the shaft 90.

Figure 7:
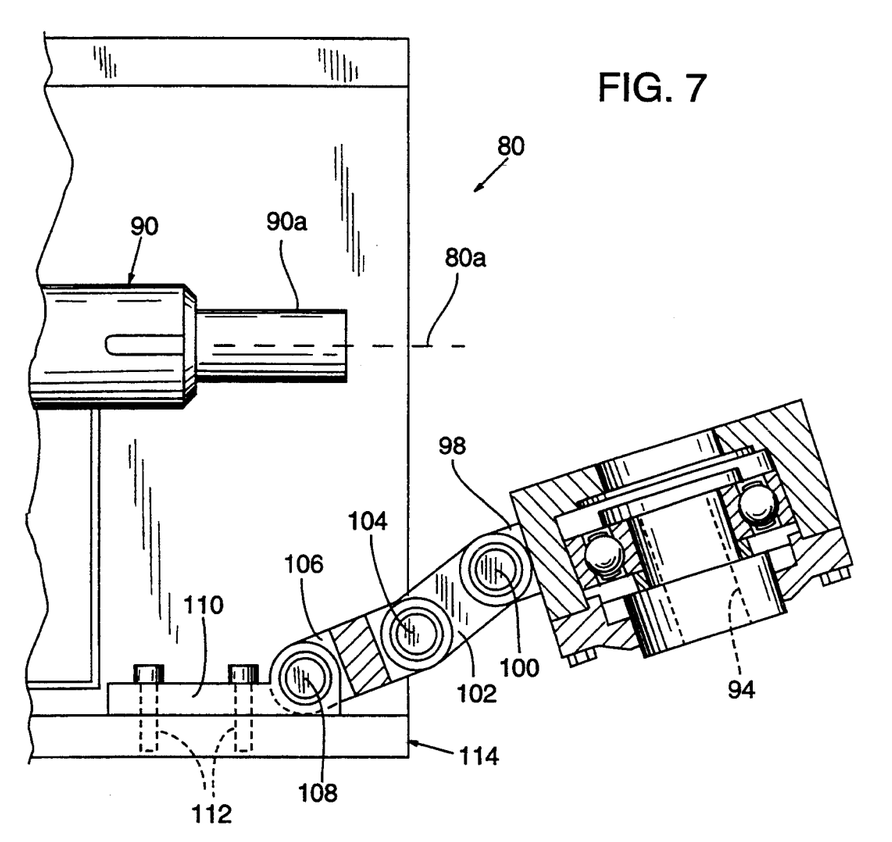
FIG. 7 illustrates a hinge mounted outboard bearing housing for quick removal and replacement of a cutter head.
Figure 8A:
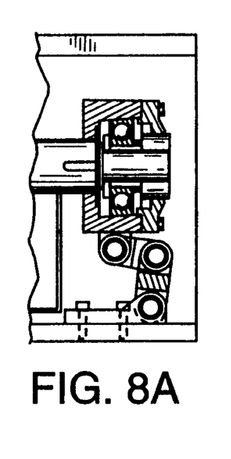
FIGS. 8A–8H illustrate operation of the assembly of FIG. 7.
Figure 8B:
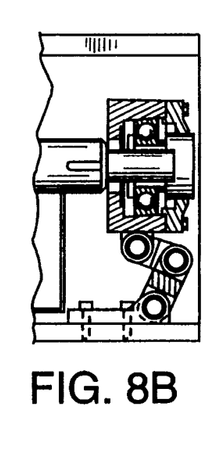
Figure 8C:
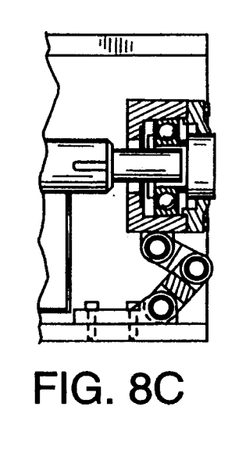
Figure 8D:
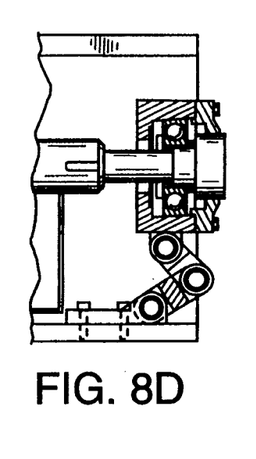
Figure 8E:
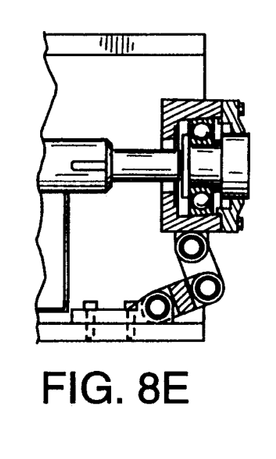
Figure 8F:
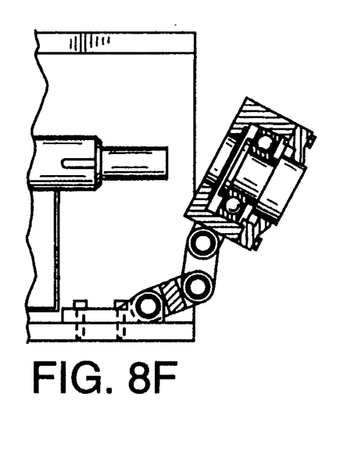
Figure 8G:
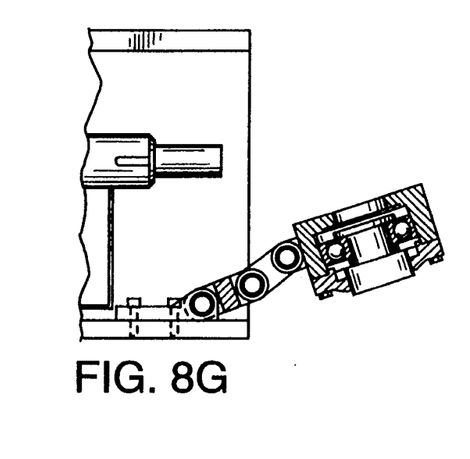
Figure 8H:
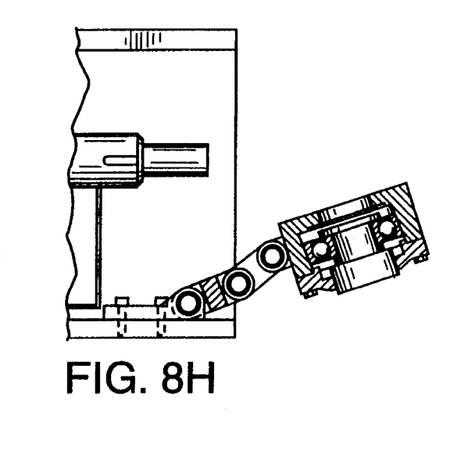

FIG. 7 illustrates in more detail the hinge arrangement 96 and its support of bearing housing 92 for mounting on the distal end 90a of shaft 90. FIGS. 8A–8H illustrate successive steps in the dismounting of housing 92 from shaft 90. In FIG. 7, housing 92 is shown dismounted from shaft 90. Bearing housing 92 and sleeve 94 are generally of conventional design, except housing 92 includes a mounting flange 98 defining a pivot point 100. A first hinge link 102 pivots at the pivot point 100 and at a pivot point 104. A second link 106 pivotally couples to the link 102 at the pivot point 104 and at its proximal end pivotally mounts at a pivot point 108 of mounting flange 110 fixedly mounted, e.g., by way of bolts 112 to the frame 114 of cutter head assembly 80. Thus, the articulated nature of the hinge arrangement 96 allows co-axial alignment of the cylindric sleeve 94 and the cylindric distal end 90a of shaft 90 whereby bearing housing 92 may move easily under manual mounting along the axis 80a of shaft 90 for mounting thereon.

Figure 9:
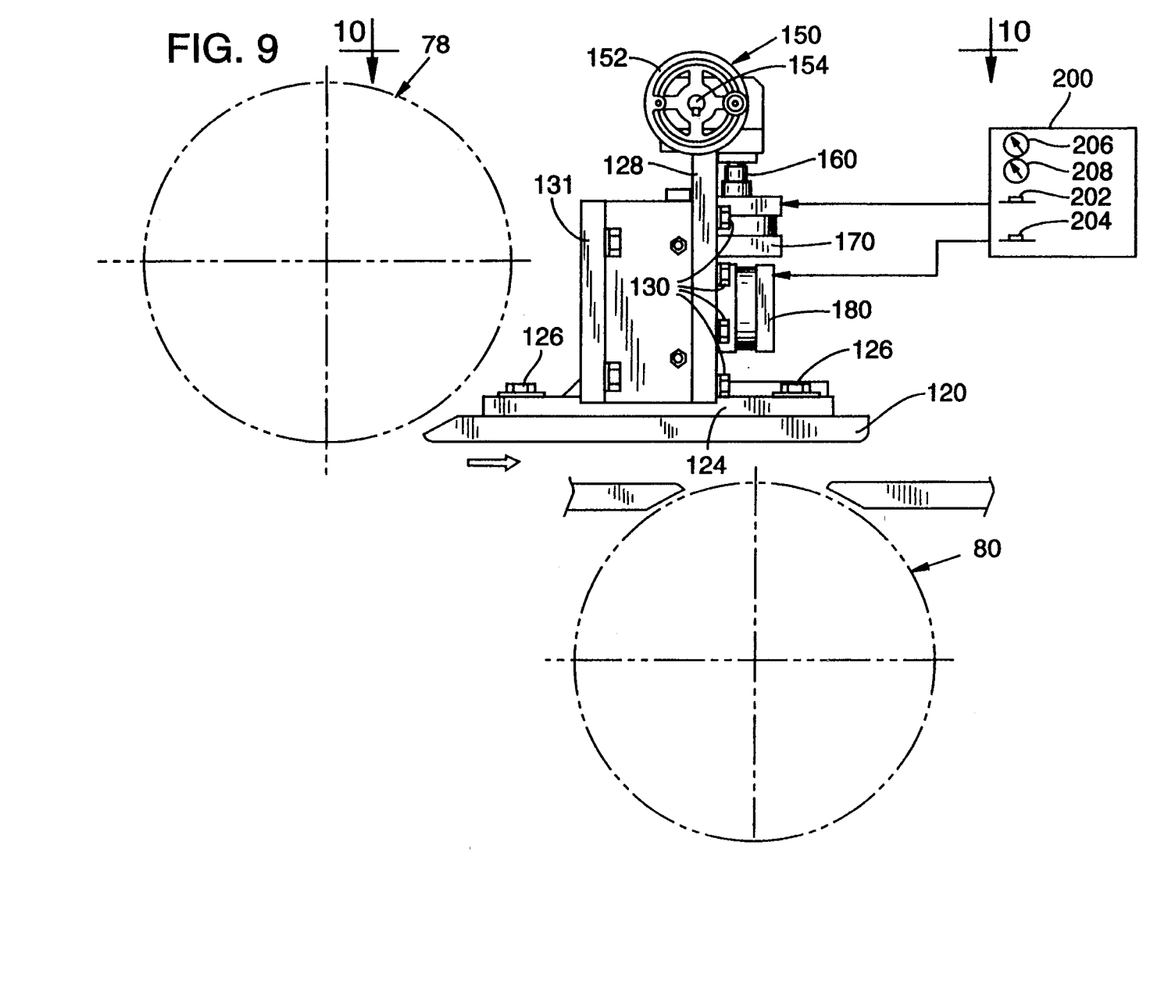
FIG. 9 is a side view of a quick open remote controlled pressure plate according to the present invention.
Figure 10:
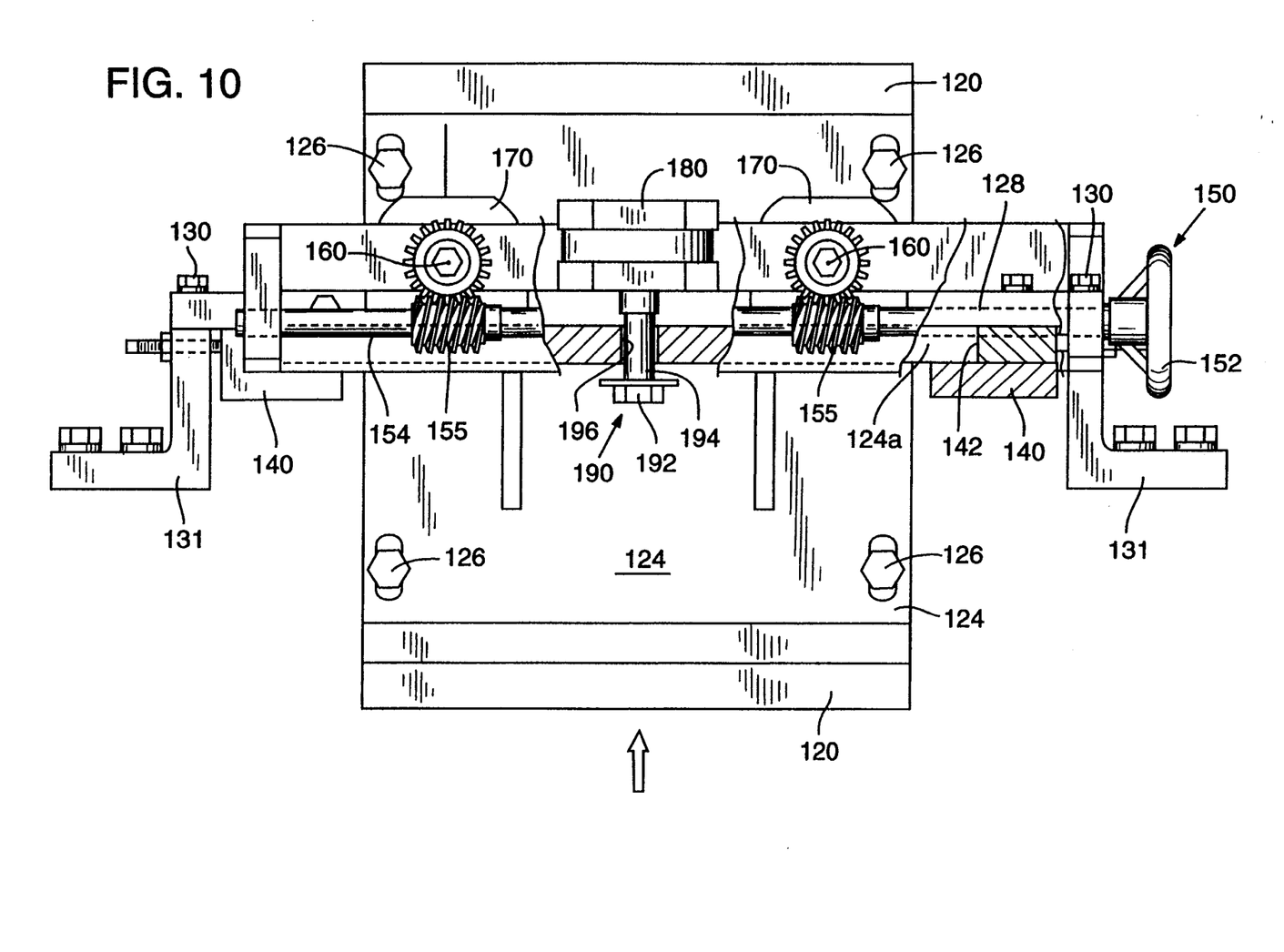
FIG. 10 is a top view of the pressure plate of FIG. 9.
Figure 11:
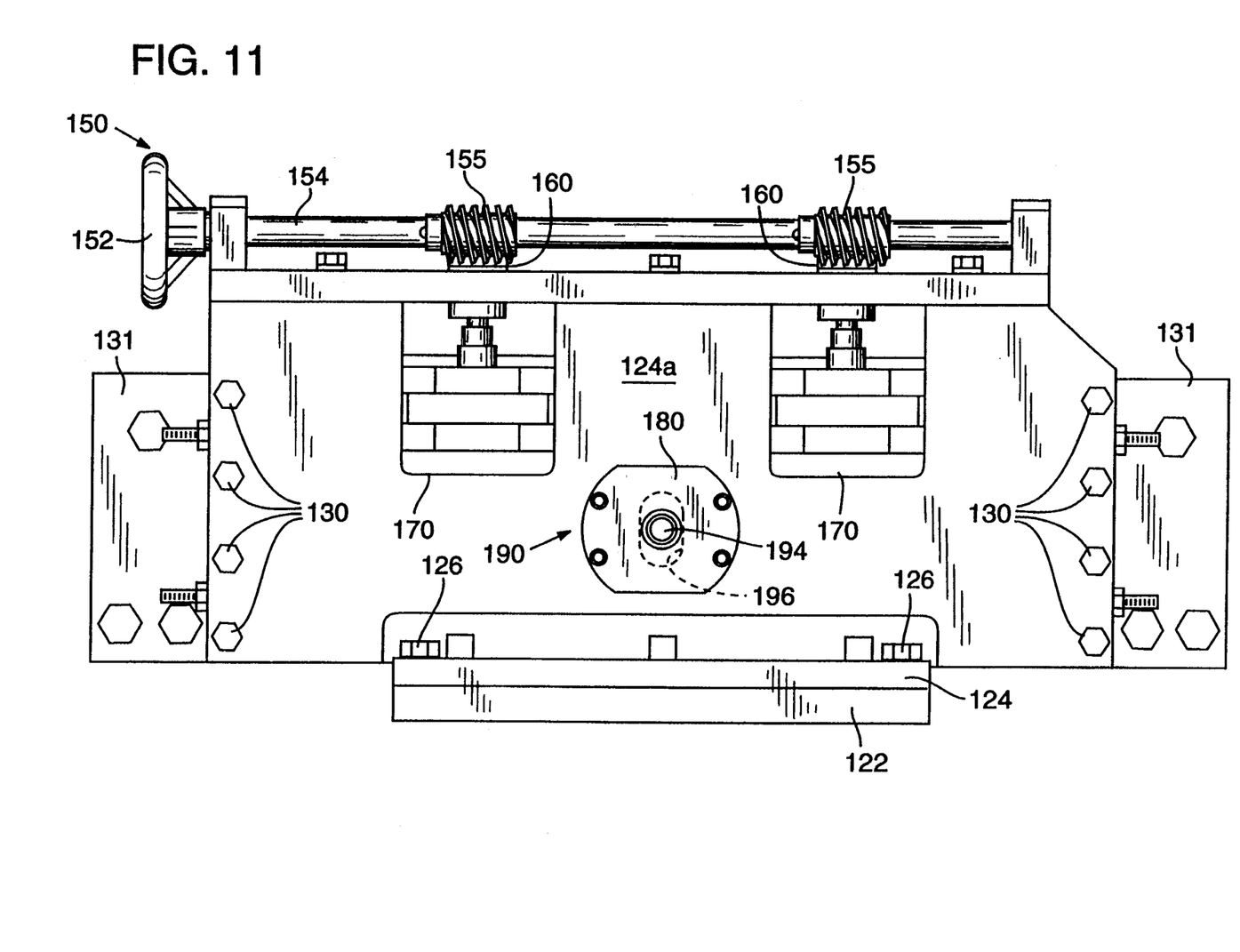
FIG. 11 is an end view of the pressure plate of FIG. 9.

FIGS. 9–11 illustrate a pressure plate 120 maintaining a selected magnitude pressure against an article following planing by the top cutter head assembly 78 and during cutting by the bottom cutter head assembly 80. Prior pressure plate assemblies maintained a fixed spacing between the pressure plate and the bottom cutting head. In some cases, cam mounted top pressure plates allowed an operator to quickly, but manually, move the pressure plate upward to accommodate an oversized or jammed wood article. Thus, under prior planer designs, the operator manually manipulates the top pressure plate upon occurrence of oversized or jammed wood articles. As may be appreciated, the need for an operator to enter the planer room and manually deal with a jammed board contributes to system down time, and therefore loss of production and loss of money. Furthermore, anytime an operator enters a planer room there exists a risk of injury to the operator in proximity of such equipment.

In FIGS. 9–11, the pressure plate arrangement of the present invention establishes a given spacing between pressure plate 120 and the cutter head of the bottom cutter head assembly 80. Such spacing, however, is not fixed absolutely. In particular, the pressure plate 120 of the present invention maintains sufficient magnitude pressure against a wood article to maintain such wood article appropriately against the cutter head 80, but can accommodate a jammed or oversized wood article by upward movement in response thereto.

Pressure plate 120 enjoys vertical freedom of movement by mounting to a vertically movable pressure plate mounting bracket 124. Bolts 126 attach plate 120 to mounting bracket 124. Mounting bracket 124 slides vertically relative to a front mounting plate 128. Front mounting plate 128 is stationary relative to the body of the pressure plate assembly. More particularly, bolts 130 mount the front mounting plate 128 to the top cutter head yoke via mounting brackets 131. Mounting bracket 124 includes an upstanding plate portion 124a. Plate 124a is captured slidably, i.e., vertically slidably, between the front mounting plate 128 and a pair of left and right guide elements 140. Spacer elements 142 (one shown in cross-section at the broken-away portion of FIG. 10) provided between guides 140 and front mounting plate 128 accommodate the thickness of plate 124a and allow vertical movement of plate 124a, and therefore vertical movement of the mounting bracket 124 and pressure plate 120.

A crank assembly 150, including a handle 152 for rotating a shaft 154, accomplishes vertical positioning of the plate 120. Shaft 154 carries worm gears 155 which turn lifting screws 160 coupled, as described hereafter, to plate 124a. Thus, by operation of the handle 152 the pressure plate 120 achieves a given vertical clearance between the cutting head of lower cutting head assembly 80 and the pressure plate 120.

Mounting screws 160 couple to the mounting bracket plate 124a by way of air pressure operated pneumatic actuators 170. Pneumatic actuators 170 allow a given magnitude vertical movement between screws 160 and plate 124a, e.g., one-half inch. By regulating the amount of pressure applied to pneumatic actuators 170 a given magnitude biasing force may be employed in maintaining the pressure plate 122 against a wood article. Thus, by selectively adjusting the magnitude of air pressure applied to actuators 170, actuators 170 accommodate jammed or oversized wood articles without bringing the entire planing operation to a halt. Under such conditions where a jam does occur, however, the operator may operate the actuators 170 remotely to raise pressure plate 122 by, for example, one-half inch to accommodate such oversized or jammed wood articles and then re-engage actuators 170 to return immediately to operation of the planer. As may be appreciated, down time is reduced by avoiding the requirement of direct manual manipulation of a pressure plate to relieve jammed or oversized wood articles and operator safety is maintained by virtue of the remote operation of actuators 170.

Pressure plate 120 further includes a pneumatic actuator 180 driving a locking arrangement 190 for selectively locking the mounting bracket plate 124a in position against the front mounting plate 128. In particular, a bolt 192 is fixedly attached to the piston rod 194 of actuator 180. Bolt 192 passes through a vertically slotted aperture 196 of front mounting plate 128 and through a cylindric, close fitting aperture in plate 124a. Thus, by drawing the bolt 192 toward actuator 180 the plate 124a is held by friction against the front mounting plate 128. In this manner, the pressure plate 120 may be maintained in a given vertical position, i.e., may be locked in position by operation of actuator 180. The slotted aperture 196, however, does permit some vertical movement of the locking arrangement 190 in response to an oversized wood article or jammed condition. The plate 120 can move vertically to some extent under such extreme, i.e., non-normal operation, conditions. If the pressure plate 120 does encounter an oversized or jammed wood article, the magnitude of downward force applied to the plate 124a by actuators 170 should be sufficient to overcome friction between the plate 124a and front mounting bracket 128 established by actuator 180. Thus, the pressure plate arrangement can survive an abnormal operating condition, i.e., oversized article or jammed article, and return to normal operation without interrupting work flow. If the system does not automatically handle such abnormal conditions, the operator need only remotely release the actuators 170 and 180 momentarily to clear the feed path and thereby remotely resolve any such abnormal condition and immediately return to operation.

In FIG. 9, a remote operator control room 200 includes release switches 202 and 204 for remote operation, i.e., release of air pressure, of the actuators 170 and 180, respectively. Control room 200 may further include air pressure regulation controls 206 and 208 for remote manipulation of air pressure applied to the actuators 170 and 180, respectively.

Figure 12:
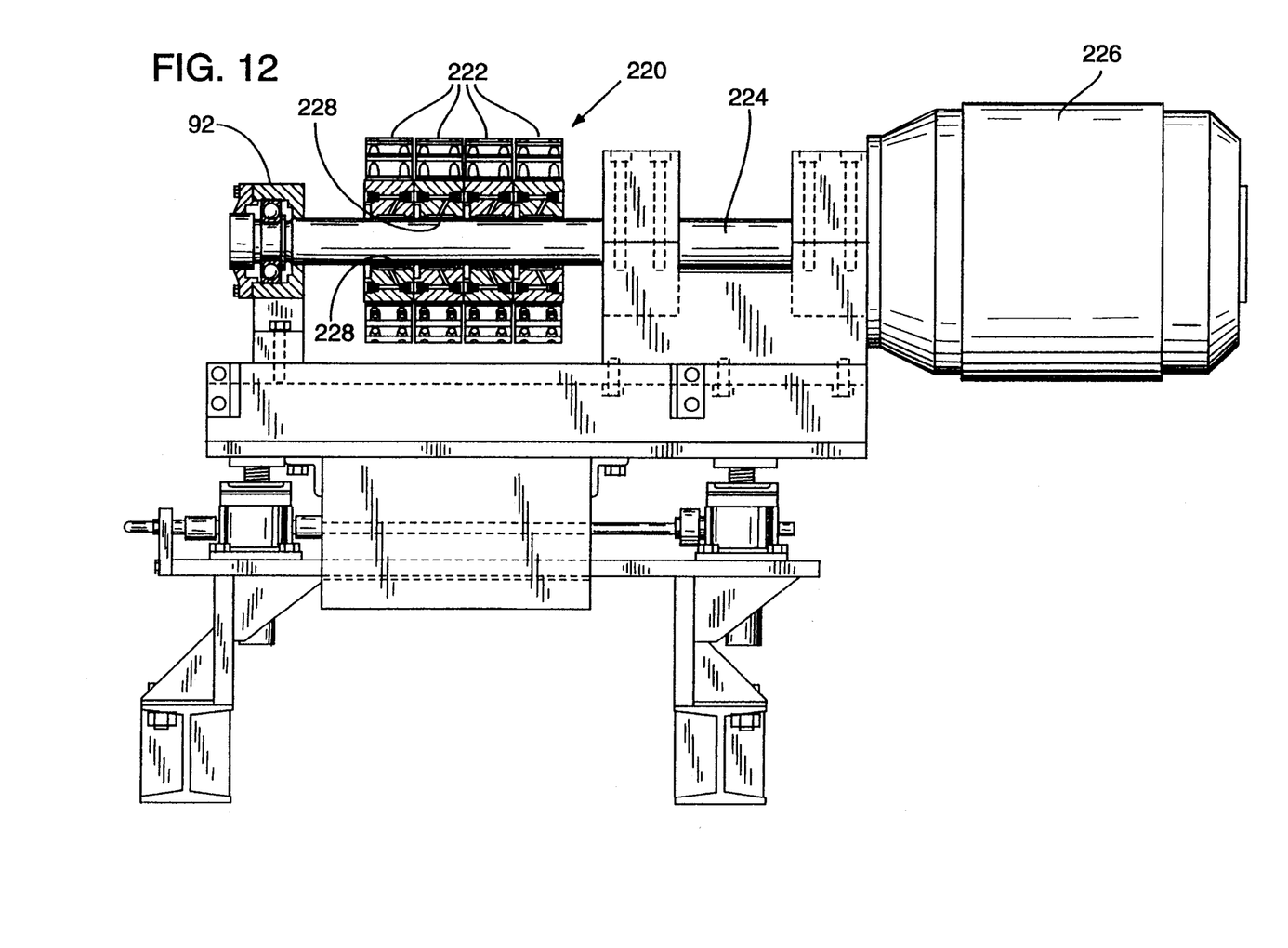
FIG. 12 illustrates a modular, stackable cutter head in accordance with the present invention as slidably mounted on the shaft of a cutter head assembly, but without cutter blades mounted thereon.

With reference to FIG. 12, planer operation is improved by use of a modular, stackable cutter head 220 comprising individual cutter modules 222. Each module 222 mounts slidably upon a cutter assembly shaft 224 driven by a cutter head assembly motor 226. Each module 222 is locked in position upon shaft 24 by means of a grease locking sleeve 228. The distal end of shaft 224 is supported upon a bearing housing 92 as described above, i.e., with housing 92 supported upon an articulated hinge (not shown in FIG. 12). The longitudinal dimension, i.e., width as seen in FIG. 12, of each module 222 is 3¼ inches and modules 222 receive cutter blades (not shown in FIG. 12) of slightly wider dimension, e.g., 3½ inches. By providing radial offset between adjacent modules 222, the blades mounted upon modules 222 may be overlapped to some extent, e.g., ⅛ inch, to provide continuous blade presentation to the board surface.

As may be appreciated by those skilled in the art, the modular aspect of the cutting head 220 supports quick dismounting, especially in conjunction with the articulated hinge mounted bearing housing 92, and therefore supports rapid cutter head change over during brief planer shutdown intervals.

Figure 13:
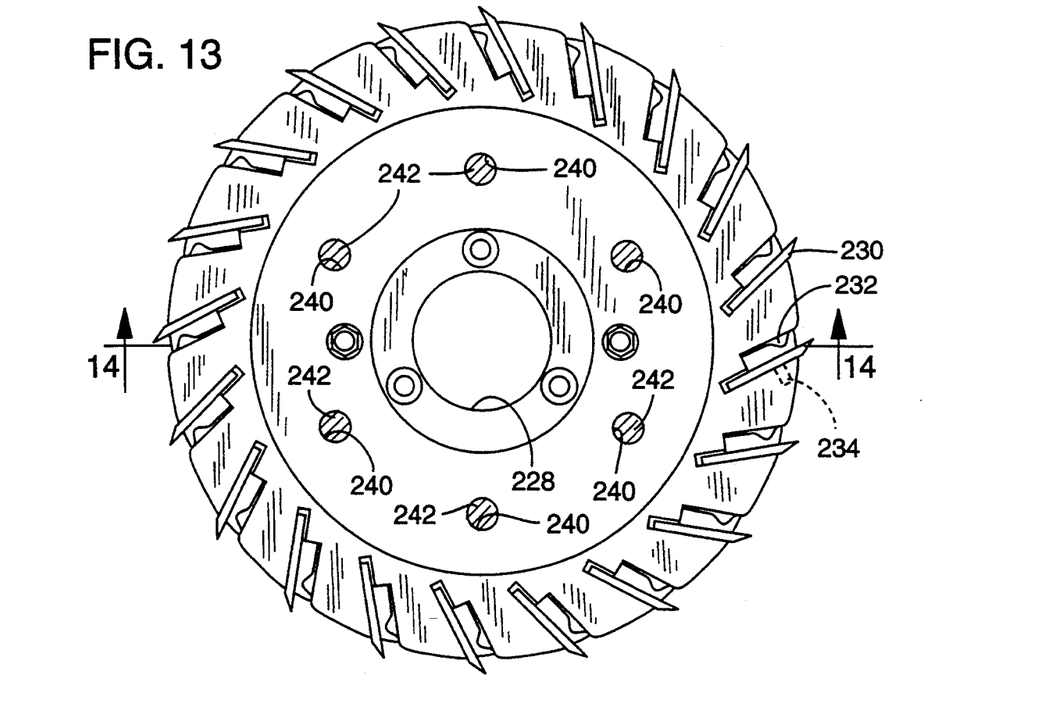
FIG. 13 is an axial view of a cutter head module of FIG. 12 showing cutter blades mounted thereon.
Figure 14:
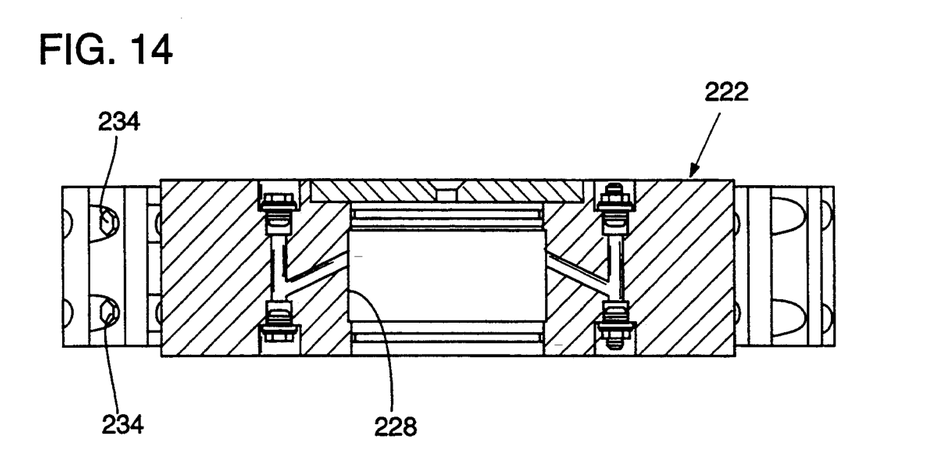
FIG. 14 is an edge view of the cutter head module of FIG. 13 as taken along lines 14—14 of FIG. 13, but without cutter blades mounted thereon.

FIG. 13 illustrates an end view of one module 222, including cutter blades 230 mounted thereon. Each blade 230 is attached to the body of module 222 by means of counter sunk screws 232 and screw holes 234. Relative position between the modules 220 is established by a set of six apertures 240 equa-angularly distributed about each module 222. By mounting the modules 222 upon shaft 224 and aligning selected ones of the apertures 240, a selected angular offset between adjacent blades 230 may be established. The apertures 240 are suitably aligned and pins 242 are placed through aligned apertures 240 for securing the established relative radial positioning of modules 222. To mount the cutting head 220, the first module 222 is placed on shaft 224 and locked in position by means of grease locking sleeve 228. Pins 242 are then positioned in the apertures 240 of the first module 222. The second module 222 is then slidably positioned on shaft 224 adjacent the first module 222, with its apertures 240 receiving the pins 240 as mounted in the first module 222. Once the second module is so positioned, its grease locking sleeve 228 is engaged to lock its position on shaft 224. This process continues until a desired number of modules 222 are mounted on shaft 224. The pins 242 remain in place during operation and act as a backup retention mechanism for the cutter head 220. In particular, if one of the modules 222 should become loose, i.e., by loss of pressure in sleeve 228, the pins 242 remain in place to secure module 222 position by virtue of the adjacent fixedly attached modules 222.

Important features of the stackable cutter head 220 are the longitudinal overlapping of knife blades 230 and the fact that each module 222 of the stackable cutter head 220 may be manually handled by one individual, i.e., each module 222 is on the order of 80 pounds, so as to avoid the need, and requirement under government safety standards, that a crane be used for articles of weight greater then, for example, 80 pounds. The interlocking pins 242 establish selected radial offsets between adjacent heads and thereby allow a longitudinal overlap between adjacent knives. Other advantages include, by nature of the modularity, an ability to swap damaged modules 222 or cycle different modules 222 out to heavy wear portions of the head 220 to achieve more uniform wear of knife blades 230. Also, the stackable cutter head modules 222 are interchangeable from top cutter head to bottom cutter head. Thus, the individual modules 222 are all the same and can be maintained in a given inventory without maintaining separate parts for separate top and bottom cutter head assemblies. This allows switching and swapping of parts and more complete use of each component. Also, localized damage to a portion of a stackable cutter head results in damage to only one component, and therefore, a much reduced cost of repair or replacement, i.e., need to only replace one module 222 not the entire cutter head or an entire knife.

Thus, where a traditional planer would have the cutter head more permanently mounted upon the shaft and require dismounting of the entire shaft, cutter head, and bearing housing to accomplish cutter head change over, the present invention proposes that individual components of the cutter head be individually replaceable, and by manual operation without the aid of a crane, for more rapid cutter head change over, and therefore more efficient overall production when cutter head change over is required during planer operation. When the blades of a cutter head require replacement, a traditional cutter head would, for most efficient operation, require that the blades be individually dismounted from the cutter head and replaced or sharpened. Under the present invention, however, the entire cutter head is more easily and more quickly removed then removing individual cutter head blades. Accordingly, under the present invention one cutter head module 222, or set of modules 222, may be quickly removed when blades become dull or damaged and replaced with a new cutter head module 222, or set of modules 222.

It will be appreciated that the present invention is not restricted to the particular embodiment that has been described and illustrated, and that variations may be made therein without departing from the scope of the invention as found in the appended claims and equivalents thereof.

What is claimed is:

1. A planer for surfacing a wood article, the planer comprising:
    a feed element applying a feed force to said wood article;
    a guide element adjacent said feed element and including a face slidably engaging said wood article, said feed force being generally parallel to said face but including a force component directed into said face whereby said wood article is maintained against said face when propelled by said feed element; and
    a planer cutter element surfacing a portion of said wood article and applying a cutting force to said wood article, said cutting force being parallel to said guide element face and generally opposite in direction relative to said feed force.

2. A planer according to claim 1 wherein said feed element is a roller having an axis of rotation normal to said feed force.

3. A planer according to claim 1 wherein said feed force is parallel to a centerline for said planer.

4. A planer according to claim 1 wherein said planer cutter element is a cutter head having an axis of rotation normal to said guide element face.

5. A planer according to claim 1 wherein said feed element is an infeed element upstream from said planer cutter element and said planer further includes an outfeed element providing an outfeed force to said wood article, said outfeed force being parallel to said guide element face.

6. In a planer for surfacing a wood article with a planer cutting element, an improvement comprising:
    a pressure plate opposing said planer cutter element to capture said wood article against said planer cutter element for surfacing of said wood article;
    a slidable mounting arrangement for said pressure plate allowing movement of said pressure plate toward and away from said planer cutter element;
    a planer frame; and
    a biased coupling between said pressure plate and said frame whereby said pressure plate maintains a given separation from said cutter element and resists said slidable movement up to a given magnitude of force along a direction of said slidable movement.

7. An improvement according to claim 6 wherein said cutting element is a bottom planer cutting head.

8. An improvement according to claim 6 wherein said biased coupling includes vertical adjustment means for selectively establishing said given separation.

9. In a planer for surfacing a wood article with a cutting element, an improvement comprising:
    a pressure plate opposing said cutter element to capture said wood article against said cutter element for surfacing of said wood article;
    a slidable mounting arrangement for said pressure plate allowing movement of said pressure plate toward and away from said cutter element;
    a planer frame; and
    a biased coupling between said pressure plate and said frame whereby said pressure plate maintains a given separation from said cutter element and resists said slidable movement up to a given magnitude of force along a direction of said slidable movement, said biased coupling being an air regulated coupling whereby an air pressure magnitude applied thereto establishes said given magnitude of force.

10. An improvement according to claim 9 wherein said improvement further comprises:
    a locking arrangement holding said pressure plate at said given separation by establishing a frictional relationship between a first plate fixedly coupled to said pressure plate and a second plate stationary relative to said frame, said first and second plates being held in face-to-face relation to establish said frictional relationship.

11. An improvement according to claim 10 wherein said given magnitude force is sufficient to to allow said slidable movement of said pressure plate.

12. In a planer including a cutting head mounted upon a shaft defining a first axis and having a cylindric distal end and including a frame, an improved bearing housing for support of the distal end of said shaft, said bearing housing comprising:
    a bearing housing including a cylindric sleeve for receiving and rotatably supporting said distal end of said shaft, said sleeve defining a second axis, said bearing housing including a first flange;
    a first link rotatably coupled at a first end thereof to said first flange;
    a second link rotatably coupled at a first end thereof to a second end of said first link;
    a second flange fixedly attached to said planer frame, a second end of said second link being rotatably coupled to said second flange whereby said bearing housing is maintained at a given vertical position maintaining said first and second axes in a horizontal plane and said first and second axes may be manually aligned without manually supporting the weight of said bearing housing for sliding said sleeve on and off said cylindric distal end of said shaft.

13. A bearing housing according to claim 12 wherein said sleeve is a grease locking sleeve.

14. A bearing housing according to claim 12 wherein said bearing housing weight is on the order of eighty pounds.

* * * * *